(12) United States Patent
Ruet (10) Patent No.: US 11,939,048 B2
(45) Date of Patent: Mar. 26, 2024

(54) ELECTROMECHANICAL SERVOCONTROL, SWASHPLATE SYSTEM HAVING AT LEAST FOUR ELECTROMECHANICAL SERVOCONTROLS, AND ROTORCRAFT

(71) Applicant: AIRBUS HELICOPTERS, Marignane (FR)

(72) Inventor: Laurent Ruet, Ventabren (FR)

(73) Assignee: AIRBUS HELICOPTERS, Marignane (FR)

( * ) Notice: Subject to any disclaimer, the term of this patent is extended or adjusted under 35 U.S.C. 154(b) by 149 days.

(21) Appl. No.: 17/746,847

(22) Filed: May 17, 2022

(65) Prior Publication Data

US 2022/0371726 A1    Nov. 24, 2022

(30) Foreign Application Priority Data

May 21, 2021    (FR) ...................................... 2105319

(51) Int. Cl.
*B64C 27/605*     (2006.01)
*B64C 11/44*      (2006.01)
*B64C 13/50*      (2006.01)
*B64C 27/68*      (2006.01)
(Continued)

(52) U.S. Cl.
CPC ............ *B64C 27/605* (2013.01); *B64C 11/44* (2013.01); *B64C 13/50* (2013.01); *B64C 27/68* (2013.01); *B64D 27/24* (2013.01); *B64C 2027/7205* (2013.01)

(58) Field of Classification Search
CPC . B64C 27/605; B64C 27/68; B64C 2027/725; H02P 8/005
See application file for complete search history.

(56) References Cited

U.S. PATENT DOCUMENTS

| 4,243,358 A | 1/1981 | Carlock et al. |
| 5,310,315 A | 5/1994 | Lafortune et al. |
| 2010/0084517 A1 | 4/2010 | Benson et al. |

(Continued)

FOREIGN PATENT DOCUMENTS

| EP | 1927543 A2 | 6/2008 |
| EP | 1927543 A3 | 12/2008 |

(Continued)

OTHER PUBLICATIONS

French Search Report for French Application No. FR2105319, Completed by the French Patent Office, dated Jan. 25, 2022, 8 pages.

*Primary Examiner* — Timothy D Collins
*Assistant Examiner* — Justin Michael Heston
(74) *Attorney, Agent, or Firm* — BROOKS KUSHMAN P.C.

(57) ABSTRACT

A linear electromechanical servocontrol comprising a power rod that is able to move in translation. The servocontrol comprises a single linear electrical actuator provided with at least one electric motor connected by a mechanical link to the power rod, the servocontrol comprising an anchor secured to the electrical actuator, the at least one electric motor being controlled by a computer, the anchor having an anchoring rod that is able to move in translation, the anchor having an anchoring brake that is configured to immobilize the anchoring rod with respect to the electrical actuator in a normal operating mode or to allow the electrical actuator to move in relation to the anchoring rod in a safe operating mode at the request of the computer.

15 Claims, 5 Drawing Sheets

(51) Int. Cl.
*B64C 27/72* (2006.01)
*B64D 27/24* (2006.01)

(56) References Cited

U.S. PATENT DOCUMENTS

| | | |
|---|---|---|
| 2010/0150719 A1 | 6/2010 | Waide et al. |
| 2013/0119187 A1 | 5/2013 | Germanetti |
| 2020/0290729 A1 | 9/2020 | Charafeddine et al. |

FOREIGN PATENT DOCUMENTS

| | | | |
|---|---|---|---|
| FR | 2438586 | A1 | 5/1980 |
| FR | 2684953 | A1 | 6/1993 |

ELECTROMECHANICAL SERVOCONTROL, SWASHPLATE SYSTEM HAVING AT LEAST FOUR ELECTROMECHANICAL SERVOCONTROLS, AND ROTORCRAFT

CROSS REFERENCE TO RELATED APPLICATIONS

This application claims priority to French patent application No. FR 21 05319 filed on May 21, 2021, the disclosure of which is incorporated in its entirety by reference herein.

TECHNICAL FIELD

The present disclosure relates to an electromechanical servocontrol, a swashplate system having at least four electromechanical servocontrols, and a rotorcraft.

BACKGROUND

A rotorcraft comprises at least one rotary wing. This rotary wing comprises a rotor provided with a plurality of blades. The rotorcraft may include a swashplate system for cyclically and collectively modifying the pitch of the rotor blades.

Such a swashplate system may comprise a stationary swashplate connected by a mechanism to each blade of the rotor. The stationary swashplate is able to move in translation along a first axis in order to collectively modify the pitch of the blades of the rotor and can oscillate about a second axis and a third axis in order to cyclically modify the pitch of the blades, i.e., as a function of the azimuth of each blade with respect to the axis of rotation of the rotor.

According to one known embodiment, the stationary swashplate is a non-rotating swashplate that does not rotate in relation to the axis of rotation of the rotor. The stationary swashplate thus cooperates with a rotating swashplate of the mechanism. The rotating swashplate is then connected to the blades by respective connecting rods. The non-rotating swashplate may be carried by a ball joint sliding on a guide tube. The rotating swashplate is connected to the non-rotating swashplate by a bearing giving only one degree of rotational freedom to the rotating swashplate relative to the non-rotating swashplate. The non-rotating swashplate, the rotating swashplate and the ball joint are able to move in unison in translation in order to collectively modify the pitch of blades. The rotating swashplate and the non-rotating swashplate can also be tilted in unison relative to the ball joint in order to cyclically modify the pitch of the blades.

Irrespective of how the stationary swashplate is connected to the rotor blades, a swashplate system may comprise at least three servocontrols hinged to the stationary swashplate in order to move it.

The servocontrols may include linear hydraulic actuators, i.e., actuators that extend or retract upon command from a hydraulic selector valve. For safety reasons, the servocontrols may comprise at least two hydraulic bodies cooperating with the same power rod in a system with stationary bodies or the same anchoring rod in a system with moving bodies.

Alternatively, the servocontrols may be electromechanical, including at least one electromechanical actuator. Such electromechanical servocontrols are in fact beneficial in that they do not require the installation of a hydraulic system, but they are exposed to a risk of seizing. For safety reasons, each servocontrol may comprise two linear electrical actuators arranged in parallel or in series. This solution is beneficial, but then has at least six electrical actuators, which has an impact on the space requirement and weight of the system.

Moreover, a servocontrol that has two electrical actuators in series is, on account of its length, difficult to fit, in particular instead of an existing hydraulic servocontrol. In addition, the parts connecting the electrical actuators to each other and to a support and to the stationary swashplate are all critical in a system with three servocontrols.

A servocontrol that has two electrical actuators in parallel has a considerable width. Moreover, such a servocontrol requires a particular mechanism to connect its electrical actuators to the stationary swashplate. This mechanism is also susceptible to seizing.

Therefore, each electromechanical or hydraulic servocontrol may comprise at least two active sub-assemblies, i.e., at least two hydraulic bodies or two electrical actuators, in order to have its own backup system.

Patent FR 2 438 586 describes a system having at least four servocontrols each having a hydraulic pump associated with a hydraulic actuator. Three servocontrols are in use at a given time, the other servocontrol or servocontrols being considered to be passive backup servocontrols that may become active in the event of failure of one of the servocontrols that is in use.

Document FR 2 684 953 describes a system provided with four hydraulic servocontrols. Each servocontrol has a power actuator, an anchoring system, and a servo valve. Three servo valves are active and one servo valve is passive in a normal operating mode.

Document US 2020/290729 A1 discloses a linear electromechanical system provided with two connectors, a rod and at least one actuating device configured to vary a distance between the connectors.

Document EP 1 927 543 A2 describes a linear electromechanical servocontrol comprising a cylindrical nut in threaded communication with an output rod.

Document US 2013/119187 A1 describes a system provided with electrical servocontrols hinged to a swashplate of a set of swashplates.

Document US 2010/150719 A1 discloses a system that comprises a hub carrying blades and one electrical actuating device per blade arranged in the hub. The actuating device comprises a housing mounted on the hub and partially accommodating a linear output shaft.

Document US 2010/084517 A1 describes a system that comprises three electromechanical actuating assemblies arranged under a periphery of a swashplate. Each actuating assembly comprises three linear actuating devices as well as a summing plate and a stationary swashplate rod.

SUMMARY

An object of the present disclosure is therefore to propose an electromechanical servocontrol in order to obtain an innovative swashplate system for controlling the pitch of the blades of a rotor, this system having a limited number of servocontrols in order to optimize the weight and cost.

The disclosure thus relates to a linear electromechanical servocontrol comprising a power rod that is able to move in translation, the servocontrol being capable, in particular, of being connected to a stationary swashplate.

In addition, the servocontrol comprises a single linear electrical actuator provided with at least one electric motor connected by a mechanical link to the power rod, the servocontrol comprising an anchor secured to the electrical actuator, said at least one electric motor being controlled by a computer, said anchor having an anchoring rod that is able to move in translation in relation to a body of the servocontrol, the anchoring rod being able to be hinged to a stationary support or to a rotating star, said anchor having at least one anchoring brake that is configured to immobilize the anchoring rod with respect to the electrical actuator in a normal operating mode and render the servocontrol transparent by allowing the electrical actuator to move in relation to the anchoring rod in a safe operating mode at the request of the computer.

Therefore, the anchoring rod is independent and separate from the power rod.

Such a servocontrol can thus be made passive and transparent in the event of failure. The term "passive" means that the servocontrol has no influence, and the term "transparent" means that the servocontrol also allows the controlled object to move freely. Such a servocontrol can also make a swashplate system reliable and robust not by duplicating the servocontrols, but as a whole.

In the normal operating mode, the anchor is fixed. The electrical actuator may extend or retract in order to move an object, for example in order to move a stationary swashplate.

In the safe operating mode, the electrical actuator can move relative to the anchoring rod under the pressure of the object. The servocontrol then follows the movements of the object.

The servocontrol may further comprise one or more of the following features, taken individually or in combination.

According to one possibility, said electrical actuator of the servocontrol may comprise several electric motors cooperating with the same actuator shaft of the mechanical link.

The electrical actuator may therefore comprise a plurality of electric motors mounted on the same shaft in order to satisfy an availability requirement.

The motor or motors may each comprise a stator surrounding a rotating part and rendering the rotating part movable relative to the stator on request, in a conventional manner.

According to one possibility compatible with the preceding possibility, the mechanical link of the servocontrol may comprise an actuator shaft secured to a rotating part of said at least one electric motor, said mechanical link comprising an actuator converter connected to said actuator shaft and to said power rod and configured to convert a rotational movement of the actuator shaft into a translational movement of said power rod, and vice versa.

For example, the actuator converter may comprise a ball screw, a roller screw or an element of a screw/nut system.

Optionally, the mechanical link or indeed the actuator converter may comprise a speed-reduction system. For example, an epicyclic gear train is arranged between a ball screw and the actuator shaft.

The actuator converter is a rotation/translation converter for connecting the rotary motor or motors to a power rod that is able to move in translation relative to the body of the servocontrol. If the motor or motors are rendered inoperative in an inactive mode of the normal operating mode, the rotating part may be set in rotation by the translational movement of the power rod relative to the body of the servocontrol under the pressure of the object controlled by the servocontrol. The servocontrol then follows the movements of the object, for example a stationary swashplate.

In the event of seizing of the electrical actuator, the anchoring rod can be released by the anchoring brake such that the servocontrol follows the movements of the object, and therefore of the stationary swashplate, if applicable.

Optionally, said actuator shaft comprises a thread cooperating with the actuator converter, for example a nut, a ball screw or the like.

According to one possibility compatible with the preceding possibilities, said anchor may comprise an anchoring shaft that is able to rotate relative to a support member secured to the electrical actuator, said anchor comprising a reversible anchoring converter connected to said anchoring shaft and to said anchoring rod and configured so that a translational movement of the anchoring shaft relative to the anchoring rod results in a rotational movement of the anchoring shaft, and vice versa, said anchoring brake being configured to immobilize said anchoring shaft relative to the anchoring rod in the normal operating mode and to release said anchoring shaft in the safe operating mode.

When the anchoring brake immobilizes the anchoring shaft, the body of the electrical actuator is stationary relative to the anchoring rod.

Conversely, when the anchoring brake no longer immobilizes the anchoring shaft, the anchoring shaft is free to rotate. The body of the electrical actuator can thus move in translation relative to the anchoring rod, the anchoring shaft then rotating about itself.

The anchoring converter may comprise a ball screw or a roller screw, a screw/nut system or the like.

Optionally, the anchoring converter may comprise a speed-reduction system. For example, an epicyclic gear train is arranged between a ball screw and the anchoring shaft.

The anchoring brake can then be simple, comprising at least one pad that is moved by an actuating device in order to press, on request, on a face of the anchoring shaft. For example, such a brake may comprise a spring tending to move a pad away from a face of the anchoring shaft and an electromagnet tending to attract said pad, stretching said spring when the electromagnet is supplied with electricity.

Alternatively, said anchor may comprise an anchoring shaft secured to the electrical actuator and able to move in translation relative to the anchoring rod, said anchoring brake being configured to connect said anchoring shaft and said anchoring rod in the normal operating mode and to disengage said anchoring shaft and said anchoring rod in the safe operating mode.

The operation is identical to the previous version. However, according to this possibility, the anchoring shaft is able to move in translation.

According to one possibility compatible with the preceding possibilities, said electrical actuator of a servocontrol may comprise an actuator brake cooperating with said power rod or an actuator shaft connected to the power rod by an actuator converter.

Such an actuator brake may be used in the event of malfunction, for example in the event of failure of at least one electric motor, in order to brake the power rod or the actuator shaft, if provided.

The actuator brake may be a zero current brake, unlike the anchoring brake, for example.

According to one possibility compatible with the preceding possibilities, said computer may be configured to control said at least one electric motor in an active mode of said normal operating mode and to inhibit said at least one electric motor in an inactive mode of said normal operating mode.

Thus, in the event of a malfunction of the servocontrol, the computer can simply render the motor or motors inactive, for example by cutting off a power line supplying power to the motor or motors, or no longer transmitting command signals to the motor or motors. In particular in the presence of an actuator converter, the servocontrol is then passive and transparent. In the event of seizing, the servocontrol is placed in the safe operating mode.

Thus, two separate devices make it possible to render a servocontrol passive and transparent.

According to one possibility compatible with the preceding possibilities, said servocontrol being able to operate according to several configurations, said configurations depending on a current operating mode of the servocontrol, said current operating mode being able to be a mode corresponding to the normal or safe operating mode, said computer may comprise one control model per possible configuration in order to control the servocontrol as a function of at least one received control signal.

The computer receives at least one control signal transmitted by a controller, the controller being able to include a control interface controlled by a human and/or an autopilot. For each possible configuration, the computer comprises a model supplying signals to be transmitted to the servocontrol as a function of the control signal or signals.

According to one possibility compatible with the preceding possibilities, the servocontrol may comprise at least one actuator operation sensor, cooperating with said power rod and/or a motor and/or the actuator shaft, said actuator operation sensor transmitting to the computer an actuator operation signal carrying information relating to the movement of said power rod in relation to a body of the servocontrol.

According to one example, the actuator operation sensor may include a current sensor designed to detect excessive electrical current consumption. Excessive electrical current consumption may mean that the motor or motors are unable to move the power rod.

According to one example, the actuator operation sensor may include a rotation sensor arranged on the actuator shaft. If the power rod cannot move in translation, the actuator shaft cannot rotate. The motor or motors may comprise an integrated rotation sensor, for example.

According to another example, an actuator operation sensor may comprise a position, speed or acceleration sensor arranged on the power rod, for example. For example, the actuator operation sensor may comprise a linear sensor comprising a measuring rod attached to the power rod and a measuring unit secured to a body of the servocontrol, for example a body of the electrical actuator. If the computer transmits an order to an electric motor to move a power rod, and the actuator operation sensor transmits a signal that does not vary, the computer deduces that a malfunction of the electric motor has occurred and may inhibit the motor or motors of the servocontrol.

According to one possibility compatible with the preceding possibilities, each servocontrol may comprise at least one anchor operation sensor, cooperating with said anchoring rod and/or the anchoring shaft, if provided, said anchor operation sensor transmitting to the computer an anchor operation signal carrying information relating to the movement of said anchoring rod in relation to a body of the servocontrol.

An anchor operation sensor may include a rotation sensor arranged on the anchoring shaft, or a position, speed or acceleration sensor arranged on the anchoring rod, for example.

In the safe operating mode, the computer may be configured to use the anchor operation signal to determine that the anchor is seized.

If so, the computer may communicate with an alerter in order to generate a visual, audible or tactile alert when a malfunction or seizing is detected.

Furthermore, a swashplate system may comprise at least four electromechanical servocontrols according to the disclosure, each hinged to a support and to a stationary swashplate for controlling the pitch of blades of a rotor.

The electric motors of said servocontrols are controlled by a common computer, said anchor of each servocontrol having a said anchoring rod hinged to the support or to the stationary swashplate.

Indeed, the swashplate system comprises at least four electromechanical servocontrols each having an electrical actuator, and possibly only four electromechanical servocontrols. Four servocontrols may be sufficient to obtain a system that is robust to failure.

In the normal operating mode, each anchor is fixed. The electrical actuator may extend or retract in order to move the stationary swashplate.

In the safe operating mode, the electrical actuator can move relative to the anchoring rod under the pressure of the stationary swashplate. The servocontrol then follows the movements of the stationary swashplate.

Thus, under normal conditions, at least three or indeed all the servocontrols are controlled to extend or retract by the computer, these servocontrols then being in an active mode of the normal operating mode. In the event of malfunction or seizing, the servocontrol in question is inhibited either by no longer being controlled, during an inactive mode of the normal operating mode, or by being rendered passive and transparent by releasing its anchor and switching to the safe operating mode. In these cases, however, at least three servocontrols remain operational and allow the blades of the rotor to be controlled.

Thus, the swashplate system as a whole becomes robust following a failure of a servocontrol, unlike a system that makes each servocontrol robust by using multiple actuators for this servocontrol.

Furthermore, the constituent parts of the servocontrols are not critical parts since, in the event of a servocontrol breaking, the system still has at least three functioning servocontrols.

According to another aspect, such a system can easily be checked prior to use. On the order of an operator, the tested servocontrol can be switched to the safe operating mode by the computer. The other servocontrols are controlled to remain stationary and to keep the stationary swashplate in the test position. The computer can thus control the electrical actuator of the servocontrol that is being tested in order to extend it over its entire travel. Since the stationary swashplate is immobilized, the electrical actuator of the servocontrol that is being tested must then move relative to its anchoring rod. If it does not, the servocontrol is defective. For safety reasons, such an operation may be carried out several times for each servocontrol.

Since said system can operate according to several configurations, said configurations depending on a current operating mode of each servocontrol, said current operating mode being able to be a mode corresponding to the normal or safe operating mode, said computer may comprise one control model per possible configuration in order to control said servocontrols as a function of at least one received control signal.

The computer receives at least one control signal transmitted by a controller, the controller being able to include a control interface controlled by a human and/or an autopilot. For each possible configuration, the computer comprises a model supplying signals to be transmitted respectively to the servocontrols as a function of the control signal or signals.

The computer chooses the model to be used depending on the servocontrol or servocontrols rendered inoperative, by default or following a malfunction, the computer controlling the servocontrols differently depending on the applied model in order to achieve the desired result.

Furthermore, a rotorcraft may be provided with a rotor comprising a plurality of blades, said rotorcraft possibly comprising a swashplate system according to the disclosure having at least four electromechanical servocontrols hinged to a stationary swashplate connected by a mechanism to each blade.

BRIEF DESCRIPTION OF THE DRAWINGS

The disclosure and its advantages appear in greater detail in the context of the following description of embodiments given by way of illustration and with reference to the accompanying figures, in which.

DETAILED DESCRIPTION

Elements that are present in more than one of the figures are given the same references in each of them.

Figure 1:
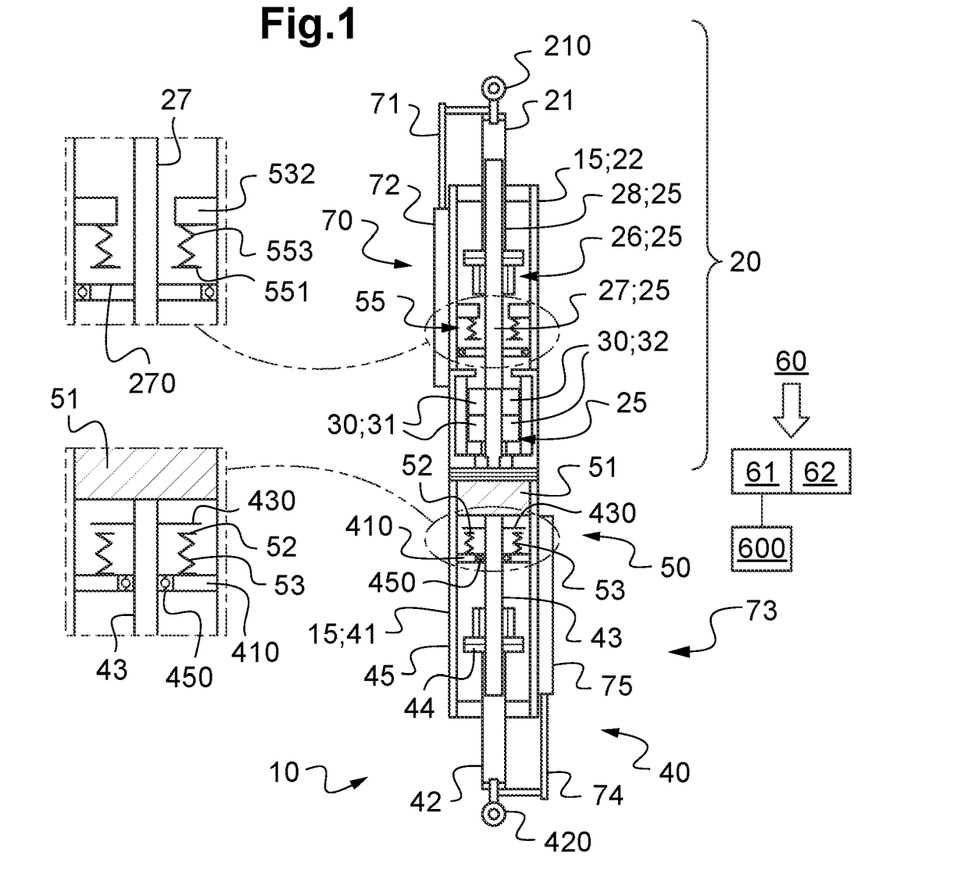
FIG. 1 is a cross-sectional diagram showing a servocontrol according to the disclosure.

FIG. 1 shows an example of a servocontrol 10 according to the disclosure. The servocontrol 10 may be arranged within a stationary swashplate system or other types of mechanical systems for moving an object, at least one servocontrol being able to be rendered passive on command. The term "passive" means that the servocontrol has no influence on the movement of the object, apart from friction.

Irrespective of its arrangement, the servocontrol 10 is a linear electromechanical servocontrol.

To this end, the servocontrol 10 comprises a power rod 21 that is able to move in translation relative to the body 15 of the servocontrol 10 along a longitudinal axis. The power rod 21 may comprise a fastener 210 to be hinged to the element to be moved or to a stationary support. In order to extend or retract the power rod 21, the servocontrol 10 comprises a single electrical actuator 20.

This electrical actuator 20 comprises an actuator body 22. This actuator body 22 is a constituent part of a body 15 of the servocontrol 10. The electrical actuator 20 also comprises at least one electric motor 30, for example housed in the actuator body 22. The electric motor or motors 30 may be translational or rotary motors connected to the power rod 21 by a mechanical link 25.

For example, the motor or motors 30 comprise a stator 32 secured to the actuator body 22 and a rotating part 31 housed at least partially in the stator 32. In a conventional manner, the electric motor or motors 30 may comprise electric coils controlled by power electronics and permanent magnets. The motor or motors 30 may be of the synchronous motor type. For example, the stator 32 comprises coils and the rotating part 31 comprises permanent magnets.

The motor or motors may comprise an integrated rotation sensor measuring a rotation of the rotating part 31.

Furthermore, the mechanical link 25 may comprise an actuator shaft 27 engaged with the motor or motors 30. The actuator shaft 27 may extend entirely into the actuator body 22, the power rod 21 being able to extend partially into the actuator body 22. Alternatively, the actuator shaft 27 may extend partially into the actuator body 22. Where appropriate, the actuator shaft 27 may be secured to the rotating part or parts 31 of the motor or motors 30.

In addition to an actuator shaft 27, the mechanical link 25 may comprise an actuator converter 26 connected to the actuator shaft 27 and to the power rod 21. If there are one or more rotary motors 30 rotating the actuator shaft 27, the actuator converter 26 converts a rotational movement of the actuator shaft 27 about the longitudinal axis into a translational movement of the power rod 21 along the longitudinal axis, and vice versa.

To this end, the actuator shaft 27 may comprise a thread 28 cooperating with the actuator converter 26 carried by the power rod 21.

The actuator converter 26 may comprise a ball screw or an equivalent, a nut secured to the power rod or the like, or may even include a speed-reduction system, etc.

Irrespective of these features, the motor or motors 30 may be connected to a computer 60 via a wired or wireless link.

For example, the computer 60 may comprise at least one processor 61 and at least one memory 62, at least one integrated circuit, at least one programmable system, or at least one logic circuit, these examples not limiting the scope to be given to the term "computer". The term "processor" may refer equally to a central processing unit (CPU), a graphics processing unit (GPU), a digital signal processor (DSP), a microcontroller, etc.

The computer 60 may be connected to a controller 600. The controller 600 transmits at least one control signal to the computer 60. The computer 60 may be configured to transmit a command signal to the motor or motors 30 in order to relay the received order. The computer 60 may also be configured to close or cut off a power line supplying power to the motor or motors 30. The computer 60 is configured, for example, to control the electric motor or motors 30 in an active mode MODA of a normal operating mode and to inhibit the electric motor or motors 30 in an inactive mode MODIA of said normal operating mode. The computer 60 can also store various configurations each providing at least one command order as a function of a control order transmitted by a controller 600.

According to another feature, the servocontrol 10 may comprise one or more actuator operation sensors 70 that cooperate with the power rod 21, the actuator shaft, or an electric motor 31.

For example, an actuator operation sensor 70 comprises a rotation sensor of an electric motor 31, for example an optical sensor or a sensor referred to by the acronym "RVDT", standing for "Rotary Variable Differential Transformer".

For example, this actuator operation sensor 70 is a linear sensor, possibly either a Hall effect sensor or a sensor referred to by the acronym "LVDT", standing for "Linear Variable Differential Transformer". The actuator operation sensor 70 may comprise a processor unit 72 and a measuring rod 71 that is able to move relative to the processor unit 72. The processing unit 72 may be fastened to the body 15 of the servocontrol 10 and, for example, to the actuator body 22. The measuring rod 71 may be secured to the power rod 21.

Consequently, each actuator operation sensor 70 is connected via a wired or wireless link to the computer 60 in order to transmit an actuator operation signal to it. The actuator operation signal carries information relating to the position, and therefore the translational movement, either of the power rod 21 relative to the body 15 of the servocontrol 10 along the longitudinal axis, or of the actuator shaft or the rotating part 31 of an electric motor.

According to another feature, the electrical actuator 20 may comprise at least one actuator brake 55 for braking the power rod 21 or the actuator shaft 27 with respect to the body of the servocontrol 10. The figures show a single actuator brake, but it is possible to arrange several actuator brakes, for safety reasons.

For example, the actuator brake 55 includes a pad 551 that is able to move in translation relative to a shoulder 270 of the actuator shaft 27, for example along the longitudinal axis, and an electromagnet 552 secured to the actuator body controlled by the computer 60. When the electromagnet 552 is no longer supplied with power, the pad 551 is pressed against the shoulder 270 of the actuator shaft 27 by a spring 553. For example, the computer 60 controls a contactor supplying power to the electromagnet 552.

Irrespective of the nature of the electrical actuator of the servocontrol 10, the servocontrol 10 comprises an anchor 40 secured to the electrical actuator 20.

The anchor 40 comprises an anchoring rod 42 that is able to move in translation relative to the body 15 of the servocontrol 10, when braking is not underway. The anchoring rod 42 may comprise a fastener 420 to be hinged either to a support, when the electrical actuator 20 is hinged to an object to be moved, or to the object, when the electrical actuator 20 is hinged to the support.

In order to immobilize the anchoring rod 21 with respect to the body 15 of the servocontrol 10, the anchor 40 comprises at least one anchoring brake 50 controlled by the computer 60. The figures show a single anchoring brake, but it is possible to arrange several anchoring brakes, for safety reasons. The anchoring brake 50 is configured such that, at the command of the computer 60, it immobilizes the anchoring rod 42 with respect to the electrical actuator 20 in a normal operating mode MODA, MODIA of the servocontrol 10, or allows the electrical actuator 20 to move with respect to the anchoring rod 42 in a safe operating mode MODS.

For example, the anchoring brake 50 is an electromechanical brake, and the computer 60 controls a contactor supplying power to the anchoring brake 50.

FIG. 1 shows an anchoring brake 50 in a rotary device.

Therefore, the anchor 40 may comprise an anchoring shaft 43 that is able to rotate relative to a support member 45 secured to the electrical actuator 20.

For example, the support member 45 comprises an anchoring body 41 that forms part of the body 15 of the servocontrol 10. The anchoring body 41 and the actuator body 22 may form one and the same part, which may be cylindrical, for example. A ball bearing 450 or the like may be interposed between the anchoring body 41 and the anchoring shaft 43, for example between a shoulder 410 of the anchoring body 41 and the anchoring shaft 43.

The anchor 40 may comprise an anchoring converter 44 connected to the anchoring shaft 43 and to the anchoring rod 42. A translational movement of the anchoring shaft 43 relative to the anchoring rod 42 along the longitudinal axis then results in a rotational movement of this anchoring shaft 43 relative to the anchoring rod 42 about the longitudinal axis. The anchoring converter 44 may comprise a ball screw or an equivalent carried by the anchoring shaft, for example. To this end, the anchoring shaft 43 may include a thread cooperating with the anchoring converter 44 carried by the anchoring rod 42. The anchoring converter 44 may comprise a ball screw or an equivalent, a nut, or may even comprise a speed-reduction system.

The anchoring shaft 43 may extend entirely into the anchoring body 41, the anchoring rod 42 being able to extend partially into the anchoring body 41. Alternatively, the anchoring shaft 43 may extend partially into the anchoring body 41.

For example, the anchoring brake 50 comprises a pad 52 that is able to move in translation along the longitudinal axis relative to a shoulder 430 of the anchoring shaft 43 as well as an electromagnet 51 controlled by the computer 60 and carried by the anchoring body 41. A spring 53 may extend between the pad 52 and a shoulder 410 of the anchoring body in order to urge the pad 52 away from the anchoring shaft 43. When the computer 60 controls a power supply to the electromagnet, the pad 52 is pressed against the shoulder 430 of the anchoring shaft 43. For example, the computer 60 controls a contactor supplying power to the anchoring brake 50.

Therefore, the anchoring brake 50 immobilizes the anchoring shaft 43 with respect to the anchoring rod 42 and the electrical actuator 20 in the normal operating mode MODA, MODIA and releases the anchoring shaft 43 in the safe operating mode MODS.

Figure 2:
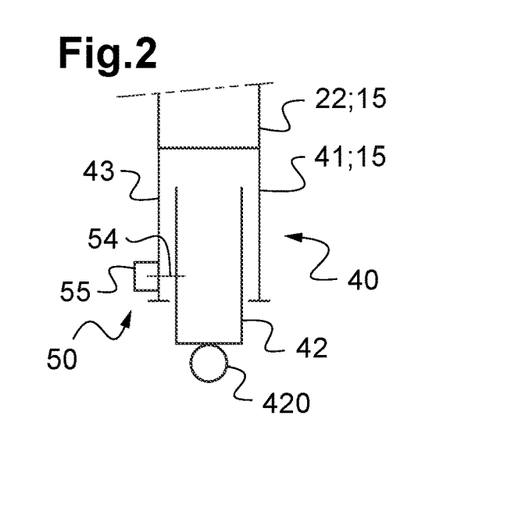
FIG. 2 is a diagram showing an anchor having an anchoring shaft that is able to move in translation.

FIG. 2 shows another embodiment, in which the anchor comprises an anchoring shaft 43 secured to the electrical actuator 20 and able to move in translation along the longitudinal axis with respect to the anchoring rod 42. Therefore, the anchoring brake 50 connects the anchoring shaft 43 and said anchoring rod 42 in the normal operating mode MODA, MODIA and disengages the anchoring shaft 43 and the anchoring rod 42 in the safe operating mode MODS.

For example, the anchoring brake 50 comprises a finger 54 penetrating into a hole in the anchoring shaft 43 and into a hole in the anchoring rod 42. The anchoring brake 50 may further comprise an actuating device 55 controlled by the computer 60 and capable of moving the finger 54 out of the hole in the anchoring rod 42.

Irrespective of the variant and with reference to FIG. 1, the servocontrol 10 may comprise at least one anchor operation sensor 73 cooperating with the anchoring rod 42 and/or the anchoring shaft 43.

For example, an anchor operation sensor 73 is a rotation sensor measuring a position of the anchoring shaft.

For example, an anchor operation sensor 73 is a linear sensor. The anchor operation sensor 73 may comprise a measuring unit 75 and a measuring bar 74 that is able to move in translation along the longitudinal axis relative to the measuring unit 75. The measuring unit 75 may be fastened to the body 15 of the servocontrol 10 and, for example, to the actuator body 22 according to FIG. 1, or to the anchoring shaft 43 according to FIG. 2. The measuring bar 74 may be secured to the anchoring rod 42.

Therefore, the anchor operation sensor 73 is connected via a wired or wireless link to the computer 60 in order to transmit an actuator operation signal to it carrying information relating to the position, and therefore the movement, of the anchoring rod 42 relative to the body 15 of the servocontrol 10.

Figure 3:
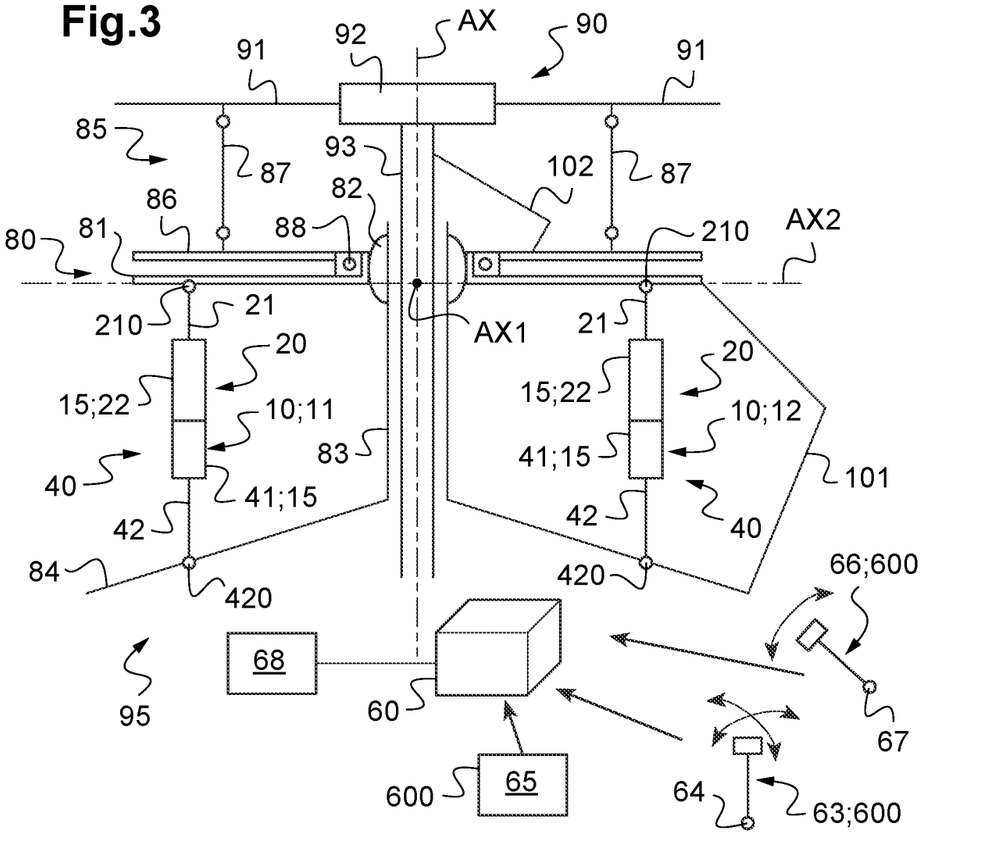
FIG. 3 is a diagram showing a vehicle provided with a swashplate system according to the disclosure.

FIG. 3 shows a vehicle provided with at least one servocontrol 10 according to the disclosure.

In particular, this vehicle is a rotorcraft 95 provided with a rotor 90 comprising several blades 91 carried by a hub 92. The rotor 90 may be set in rotation about an axis of rotation AX by a rotor mast 93 connected to the hub 92, the rotor mast 93 being set in motion by a power plant that is not shown here, for the sake of simplicity. In order to modify the pitch of the blades 91, the rotorcraft 95 comprises a swashplate system 80.

The system 80 comprises a stationary swashplate 81 connected by a mechanism 85 to each blade 91. For example, the stationary swashplate 81 is arranged on a ball joint 82 that is able to move in translation along the axis of rotation AX on a guide tube 83. The stationary swashplate 81 may thus be moved in translation along the axis of rotation AX together with the ball joint 82, and may perform two rotations about two axes AX1, AX2 orthogonal to the axis of rotation AX.

The stationary swashplate 81 may be a swashplate that does not rotate about the axis of rotation AX. For this purpose, the stationary swashplate 81 may be hinged to stationary scissors 101 fastened to the guide tube 83 or to a support 84 that may be secured to the guide tube 83.

The mechanism 85 may comprise a rotating swashplate 86 having only one degree of rotational freedom relative to the stationary swashplate 81. For example, the rotating swashplate 86 is carried by the stationary swashplate 81, a bearing system 88 being interposed between the rotating swashplate 86 and the stationary swashplate 81. The rotating swashplate 86 may be hinged to drive scissors 102, the drive scissors 102 being hinged to the rotor mast 93 or to the hub 92, for example. The system 80 further comprises one pitch link 87 per blade 91, each pitch link 87 being hinged to a blade 91 and to the rotating swashplate 86.

This swashplate system 80 is equipped with at least four electromechanical servocontrols 10, and only four servocontrols 11-14, for example.

Reference 10 denotes any servocontrol, references 11-14 denoting specific servocontrols.

Each servocontrol 10 is then hinged to the stationary swashplate 81 and to the support 84, via the electrical actuator 20 and the anchor 40 respectively, as shown in FIG. 3, or via the anchor 40 and the electrical actuator 20 respectively, according to an example that is not shown here in order not to unduly increase the number of figures. The servocontrols 10 are controlled by the same computer 60.

The rotorcraft 95 may include at least one controller 600 transmitting a control signal to the computer 60 to extend or retract at least one of the servocontrols 11-14.

For example, such a controller 600 may comprise an autopilot 65 or an interface that can be operated by a human pilot.

Such an interface may comprise a lever 66 that can be rotated about a single axis in order to control a collective variation in the pitch of the blades 91. Thus, an interface sensor 67 may transmit a control signal to the computer 60 carrying a position of the lever 66. For example, the interface sensor 67 may comprise a potentiometer.

The term "signal" may refer equally to a digital, analog, electrical or optical signal, for example.

For example, such an interface may comprise a stick 63 that can be rotated about two axes in order to control a cyclic variation in the pitch of the blades 91. Thus, an interface sensing device 64 may transmit a control signal to the computer carrying a position of the stick 63. For example, the interface sensing device 64 may comprise two potentiometers.

According to another aspect, the computer 60 may communicate with an alerter 68 to generate a visual, audible or tactile alarm, if necessary.

Moreover, each servocontrol 10 may either be in the active mode MODA or the inactive mode MODIA of the normal operating mode or in the safe operating mode MODS. Therefore, the system 80 may be in various configurations, depending on a current operating mode of each servocontrol 10. Each configuration is associated with a particular operating mode of each servocontrol 10. For example, one configuration corresponds to a state in which all the servocontrols 11-14 are in the active mode MODA, another configuration corresponds to a state in which the first servocontrol 11 is in the inactive mode MODIA and the other servocontrols 12-14 are in the active mode MODA, another configuration corresponds to a state in which the first servocontrol 11 is in the safe operating mode MODS and the other servocontrols 12-14 are in the active mode MODA, etc. Therefore, the computer 60 stores one control model per possible configuration, each control model indicating how to control each servocontrol 10 as a function of the received control signal.

For example, each model may comprise one or more equations, a matrix or the like, which determine, in a conventional manner, a command signal to be transmitted to a servocontrol 10 as a function of the received control signal.

Figure 4:
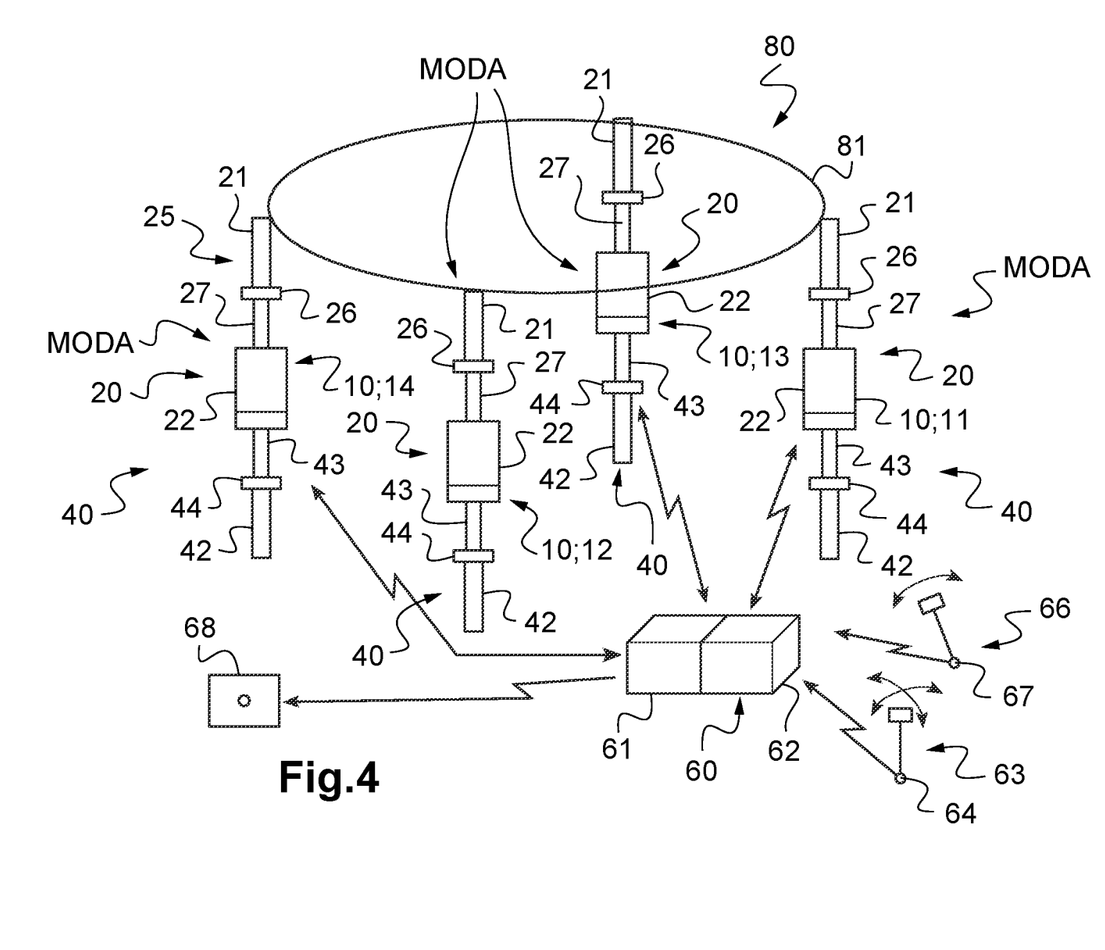
FIG. 4 is a diagram showing the operation of a swashplate system according to the disclosure.
Figure 5:
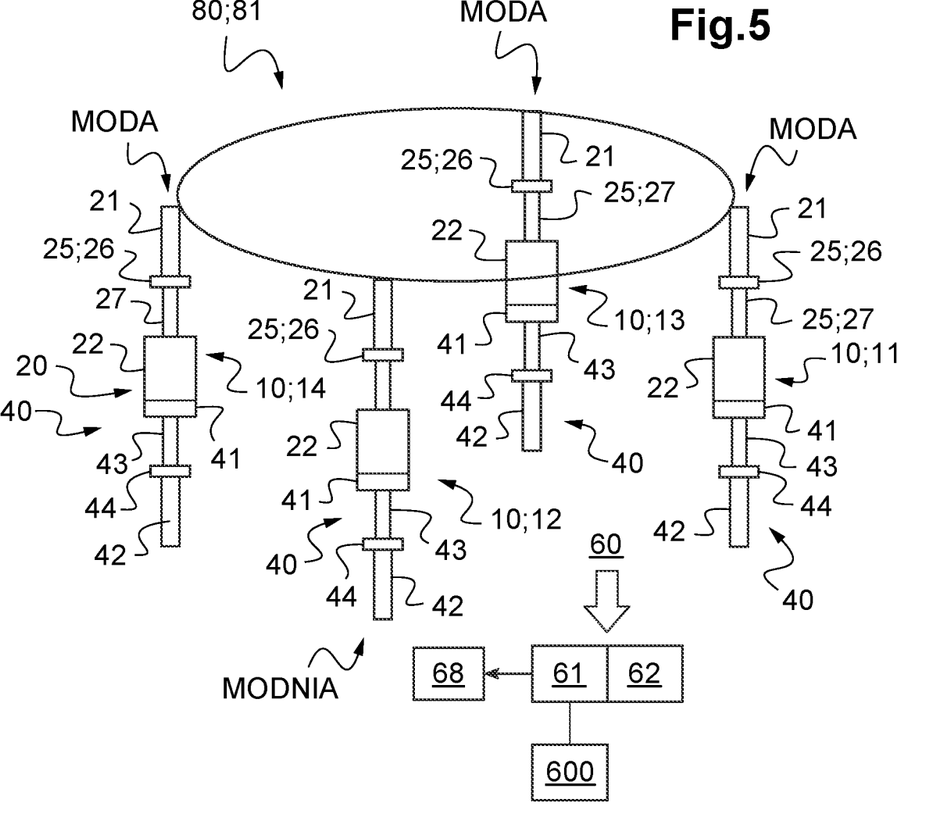
FIG. 5 is a diagram showing the operation of a swashplate system according to the disclosure.
Figure 6:
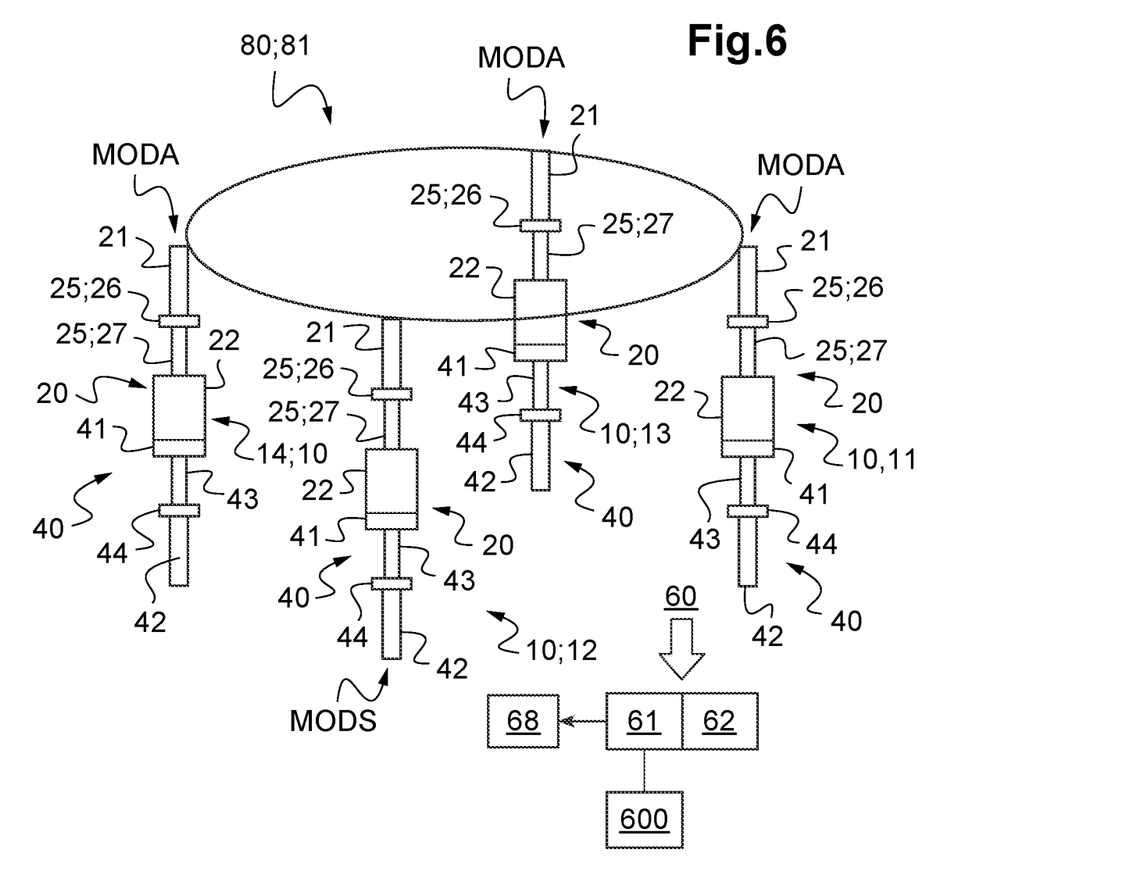
FIG. 6 is a diagram showing the operation of a swashplate system according to the disclosure.

FIGS. 4 to 6 show an example of the operation of a system according to the disclosure.

With reference to FIG. 4, at least three servocontrols 12, 13, 14 are in the active mode MODA of the normal operating mode. The anchoring rods of these three servocontrols 12, 13, 14 are stationary relative to the respective electrical actuator 20. The computer 60 applies a first model and transmits a command signal to at least one electric motor 30 of these three servocontrols 12, 13, 14 in order to extend them, retract them or keep them at a given length as a function of a signal transmitted by one of the interfaces or by the autopilot.

Optionally, all the servocontrols 11-14 are in the active mode MODA of the normal operating mode, or at least one servocontrol 11-14 is in the inactive mode MODIA of the normal operating mode. According to the example shown, the servocontrol is in this inactive mode MODIA, the power rod 21 of this servocontrol 11 being free to move in translation along the longitudinal axis relative the body 15 of the servocontrol 11. To this end, the rotating part or parts of the motor or motors are left free to rotate relative to the stator or stators.

With reference to FIG. 5, the electric motor 30 of one of the servocontrols 11-14 in the active mode may malfunction, the servocontrol 12 having failed according to the example shown. The computer 60 can easily detect such a failure. If the actuator operation sensor 70 of this servocontrol 12 transmits a measurement signal to the computer 60 indicating that the actuator operation sensor 70 is retracting or extending in a manner that does not correspond to the given order, the computer 60 can deduce from this that there is a malfunction. Such a malfunction may result from mechanical seizing or from a failure of an electric motor 30, for example.

The computer 60 can transmit an alert signal to an alerter 68 in order to generate a malfunction alarm.

In the absence of mechanical seizing of the electrical actuator 20, the power rod 21 of the servocontrol 12 is able to move relative to the electric motor or motors 30 of this servocontrol 12. In this case, the actuator converter 26 allows the power rod 21 to move in translation along the longitudinal axis relative to the actuator shaft 27.

The computer 60 can then switch the failed servocontrol 12 to the inactive mode MODIA of the normal operating mode, for example by opening a contactor supplying power to the electric motor or motors 30 of this servocontrol 12. In addition, the computer 60 changes the operating model and controls the servocontrol 11 which switches from the inactive mode MODIA to the active mode MODA.

With reference to FIG. 6, if the computer 60 detects seizing of the servocontrol 12, the computer 60 controls the anchoring brake of this servocontrol 12 in order to disengage the electrical actuator 20 from the anchoring rod 42. If the actuator operation sensor 70 transmits a measurement signal to the computer 60 indicating that the actuator operation sensor 70 is not retracting or extending, yet the computer 60 is controlling the other servocontrols 11, 13-14 to move the stationary swashplate 81, the computer 60 can deduce from this that the servocontrol is seized.

The seized servocontrol 12 then follows the movements of the stationary swashplate 81 and the flight may continue as normal.

The computer 60 can transmit an alert signal to an alerter 68 in order to generate a seizing alarm.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A linear electromechanical servocontrol comprising a power rod that is able to move in translation,
wherein the servocontrol comprises a single linear electrical actuator provided with at least one electric motor connected by a mechanical link to the power rod, the servocontrol comprising an anchor secured to the electrical actuator, the at least one electric motor being controlled by a computer, the anchor having an anchoring rod that is able to move in translation in relation to a body of the servocontrol, the anchor having at least one anchoring brake that is configured to immobilize the anchoring rod with respect to the electrical actuator in a normal operating mode and render the servocontrol transparent by allowing the electrical actuator to move in relation to the anchoring rod in a safe operating mode at the request of the computer.

2. The servocontrol according to claim 1,
wherein the electrical actuator comprises several electric motors cooperating with the same actuator shaft of the mechanical link.

3. The servocontrol according to claim 1,
wherein the mechanical link comprises an actuator shaft secured to a rotating part of the at least one electric motor, the mechanical link comprising an actuator converter connected to the actuator shaft and to the power rod and configured to convert a rotational movement of the actuator shaft into a translational movement of the power rod, and vice versa.

4. The servocontrol according to claim 3,
wherein the actuator shaft comprises a thread cooperating with the actuator converter.

5. The servocontrol according to claim 1,
wherein the anchor comprises an anchoring shaft that is able to rotate relative to a support member secured to the electrical actuator, the anchor comprising a reversible anchoring converter connected to the anchoring shaft and to the anchoring rod and configured so that a translational movement of the anchoring shaft relative to the anchoring rod results in a rotational movement of the anchoring shaft, and vice versa, the anchoring brake being configured to immobilize the anchoring shaft relative to the anchoring rod in the normal operating mode and to release the anchoring shaft in the safe operating mode.

6. The servocontrol according to claim 1,
wherein the anchor comprises an anchoring shaft secured to the electrical actuator and able to move in translation relative to the anchoring rod, the anchoring brake being configured to connect the anchoring shaft and the anchoring rod in the normal operating mode and to disengage the anchoring shaft and the anchoring rod n the safe operating mode.

7. The servocontrol according to claim 1,
wherein the electrical actuator comprises an actuator brake cooperating with the power rod or an actuator shaft connected to the power rod by an actuator converter.

8. The servocontrol according to claim 1,
wherein the computer is configured to control the at least one electric motor in an active mode of the normal operating mode and to inhibit the at least one electric motor in an inactive mode of the normal operating mode.

9. The servocontrol according to claim 1,
wherein, the servocontrol being able to operate in several configurations, the configurations depending on a current operating mode of the servocontrol, the current operating mode being able to be a mode corresponding to the normal or safe operating mode, the computer comprises one control model per possible configuration in order to control the servocontrol as a function of at least one received control signal.

10. The servocontrol according to claim 1,
wherein the servocontrol comprises at least one actuator operation sensor, the actuator operation sensor transmitting to the computer an actuator operation signal carrying information relating to the movement of the power rod in relation to a body of the servocontrol.

11. The servocontrol according to claim 1,
wherein the servocontrol comprises at least one anchor operation sensor, the anchor operation sensor transmitting to the computer an anchor operation signal carrying information on the movement of the anchoring rod in relation to a body of the servocontrol.

12. A swashplate system having at least four electromechanical servocontrols each hinged to a support and to a stationary swashplate for controlling the pitch of blades of a rotor,
wherein each servocontrol is according to claim 1, the electric motors of the servocontrols being controlled by a common computer, the anchor of each servocontrol having an anchoring rod hinged to the support or to the stationary swashplate.

13. The system according to claim 12,
wherein, the system being able to operate in several configurations, the configurations depending on a current operating mode of each servocontrol, the current operating mode being able to be a mode from the normal or safe operating mode, the computer comprises one control model per possible configuration in order to control the servocontrols as a function of at least one received control signal.

14. The system according to claim 12,
wherein the system comprises only four servocontrols.

15. A rotorcraft provided with a rotor comprising a plurality of blades, the rotorcraft comprising the swashplate system having at least four electromechanical servocontrols hinged to a stationary swashplate connected by a mechanism to each blade,
wherein the swashplate system is according to claim 12.

* * * * *